«12» United States Patent
Tsurumi et al.

(10) Patent No.: US 9,051,983 B2
(45) Date of Patent: Jun. 9, 2015

(54) ELECTRIC PARKING BRAKE DEVICE

(75) Inventors: Keiichi Tsurumi, Konan (JP); Hideyuki Kai, Anjo (JP); Mitsuyasu Mizuno, Anjo (JP); Eiji Inaya, Toyota (JP); Jin Yamada, Anjo (JP); Hisashi Kobayashi, Toyota (JP); Minoru Tabata, Toyota (JP); Kazuhiro Suzuki, Toyota (JP)

(73) Assignees: ADVICS CO., LTD., Kariya-Shi, Aichi-Ken (JP); HOSEI BRAKE INDUSTRY CO., LTD., Toyota-Shi, Aichi-Ken (JP)

( * ) Notice: Subject to any disclaimer, the term of this patent is extended or adjusted under 35 U.S.C. 154(b) by 317 days.

(21) Appl. No.: 13/432,700

(22) Filed: Mar. 28, 2012

(65) Prior Publication Data
US 2012/0247895 A1    Oct. 4, 2012

(30) Foreign Application Priority Data

Mar. 31, 2011  (JP) ................................. 2011-077615
Oct. 25, 2011  (JP) ................................. 2011-233877

(51) Int. Cl.
| F16D 65/28 | (2006.01) |
| F16D 65/22 | (2006.01) |
| B60T 13/74 | (2006.01) |
| F16D 51/22 | (2006.01) |
| F16D 121/24 | (2012.01) |
| F16D 125/40 | (2012.01) |

(52) U.S. Cl.
CPC .............. *F16D 65/22* (2013.01); *B60T 13/741* (2013.01); *F16D 51/22* (2013.01); *F16D 2121/24* (2013.01); *F16D 2125/40* (2013.01)

(58) Field of Classification Search
USPC .......... 188/79.55, 79.56, 325–343, 156, 161, 188/162
See application file for complete search history.

(56) References Cited

U.S. PATENT DOCUMENTS

| 4,101,011 | A | * | 7/1978 | Burnett ....................... 188/79.56 |
| 4,353,441 | A | * | 10/1982 | Roberts ......................... 188/328 |
| 4,363,387 | A | * | 12/1982 | Roberts ......................... 188/333 |
| 4,364,456 | A | * | 12/1982 | Colpaert ................... 188/106 A |
| 4,416,356 | A | * | 11/1983 | Osborne ....................... 188/326 |

(Continued)

FOREIGN PATENT DOCUMENTS

| JP | 11105680 A | * | 4/1999 | ............... B60T 7/02 |
| JP | 2009-092092 A | | 4/2009 | |
| JP | 2011-099458 A | | 5/2011 | |

OTHER PUBLICATIONS

Machine Translation of JP 11-105680 (no date).*

*Primary Examiner* — Nicholas J Lane
(74) *Attorney, Agent, or Firm* — Buchanan Ingersoll & Rooney PC

(57) ABSTRACT

In the interior of a brake drum, the arrangement space in the rotational axis direction of the brake drum is spacious in comparison with that in the direction orthogonal to the rotational axis direction in which an anchor portion, hub components on the vehicle body side and the like are arranged. An electric parking brake device is provided with the anchor portion that supports respective one ends of brake shoes. A parking lever is pivotally moved by a drive unit operated by an electric motor for pushing the brake shoes toward the brake drum. The anchor portion and the drive unit are arranged to be piled up in the rotational axis direction of the brake drum which is spacious in comparison with the direction orthogonal to the rotational axis direction.

8 Claims, 11 Drawing Sheets

(56) References Cited

U.S. PATENT DOCUMENTS

| | | | |
|---|---|---|---|
| 4,429,772 A * | 2/1984 | Roberts | 188/328 |
| 4,553,647 A * | 11/1985 | Spaargaren | 188/206 R |
| 5,855,255 A * | 1/1999 | Bock et al. | 188/162 |
| 6,877,592 B2 * | 4/2005 | Ikeda | 188/328 |
| 2007/0193838 A1 * | 8/2007 | Inagaki et al. | 188/265 |
| 2009/0200124 A1 * | 8/2009 | Heise | 188/162 |
| 2010/0206677 A1 | 8/2010 | Shiraki | |
| 2011/0120819 A1 * | 5/2011 | Ikeda et al. | 188/79.55 |
| 2012/0193178 A1 * | 8/2012 | Yamada et al. | 188/162 |
| 2012/0234640 A1 * | 9/2012 | Jung et al. | 188/325 |
| 2014/0020997 A1 * | 1/2014 | Bach et al. | 188/325 |

* cited by examiner

ELECTRIC PARKING BRAKE DEVICE

INCORPORATION BY REFERENCE

This application is based on and claims priorities under 35 U.S.C. 119 with respect to Japanese Patent Applications No. 2011-077615 filed on Mar. 31, 2011 and No. 2011-233877 filed on Oct. 25, 2011, the entire contents of which are incorporated herein by reference.

BACKGROUND OF THE INVENTION

1. Field of the Invention

The present invention relates to an electric parking brake device and particularly, to an electric parking brake device wherein a parking lever for bringing brake linings of brake shoes into friction engagements with a brake drum is pivotally moved by an electric motor.

2. Discussion of the Related Art

For example, JP2009-092092 A (equivalent of US 2010/0206677 A1) describes the following electric parking brake device. In the electric parking brake device, a pushing device for pushing brake shoes to press brake linings on a brake drum is provided in the vicinity of an anchor block supporting respective one ends of the brake shoes. The pushing device is composed of an electric motor, a worm, a worm wheel, a screw member and a shoe pushing rod. The motor is fixed with a main body of the motor protruding on a vehicle body side relative to a back plate (backing plate) and with an output shaft of the motor protruding on a brake drum side through a through hole formed in the back plate. The worm is fitted on the output shaft of the motor. The screw member is bodily held on an inner circumference side of the warm wheel through a key.

A female screw is formed on the inner circumferential side of the screw member, while a male screw screw-engaged with the female screw of the screw member is formed on the outer circumferential side of the shoe pushing rod. Then, the shoe pushing rod is held to be relatively movable in the axial direction relative to the screw member. End portions of the shoe pushing rod are put between the brake shoes, and the shoe pushing rod is prevented from rotation about the axis thereof. The screw member is held to be relatively rotatable relative to a housing through bearings. In the electric parking brake device, the rotational motion of the motor is converted into the linear motion to move the shoe pushing rod in the axial direction, whereby the brake shoes are pushed to bring the brake linings into friction engagements with the brake drum.

In the electric parking brake device described in the Japanese application, the main body of the motor is fixed to project into the vehicle body side beyond the back plate. Therefore, the motor is exposed to the outside of the brake drum, which is not preferable in light of waterproof and dustproof. Further, for example, JP2011-099458 A describes the following electric parking brake device. The electric parking brake device is provided with an expansion/contraction device that widens the brake shoes to push the brake linings on the brake drum, and an electric motor for driving the expansion/contraction device. The motor is fixed to project into the vehicle body side beyond a back plate and is covered with a cover. Thus, the waterproof and the dustproof of the motor can be ensured.

In the electric parking brake devices described in the aforementioned Japanese applications, because the motor is fixed to project largely into the vehicle body side, it is feared that the motor interferes with hub components on the vehicle body side. In order to solve the problem, the motor suffices to be housed in the interior of the brake drum. However, a motor housing space in the interior of the brake drum is restrained, because it is necessary to avoid the interferences of the motor with the anchor block and the hub components on the vehicle body side. Further, the motor that outputs a power depending on the vehicle weight tends to increase in dimension and thus, it may be the case that the motor cannot be housed in the interior of the brake drum. Although if the brake drum were increased in dimension, the motor could be housed in the interior of the brake drum, there would arise a problem that restrains models of vehicles to which such a brake drum is attachable.

SUMMARY OF THE INVENTION

Accordingly, it is an object of the present invention to provide an electric parking brake device being excellent in the property of mounting a drive unit such as an electric motor and the like that pivotally moves a parking lever, in the interior of a brake drum.

Briefly, according to the present invention, there is provided an electric parking brake device, which comprises a back plate having an outside surface secured to an attaching portion on a vehicle body side; a pair of brake shoes provided on an inside surface side of the back plate, respectively having brake linings frictionally engageable with a brake drum arranged rotatably about a rotational axis, and pivotally supported on the back plate; an anchor portion supporting respective one end portions of the pair of brake shoes; a parking lever pivotally supported by one of the brake shoes at one end thereof and having a connection member interposed between itself and the other of the brake shoes for widening the pair of brake shoes toward the brake drum side with fulcrums set on the respective one end portions supported on the anchor portion to bring the pair of brake linings into friction engagements with the brake drum when pivotally moved; and a drive unit. In the drive unit, a rotational member and an axial motion member mutually fitted through a converting mechanism for converting a rotational motion into a linear motion are supported by a case, and the axial motion member is connected to the other end of the parking lever to be restrained from rotation. When the rotational member is rotationally driven by an electric motor, the axial motion member is axially moved to pivotally move the parking lever. In the electric parking brake device, the anchor portion and the drive unit are arranged to be piled up in a direction of the rotational axis.

With this construction, the anchor portion and the drive unit are arranged to be piled up in the rotational axis direction of the brake drum the space in which is roomy in comparison with the arrangement space in a direction orthogonal to the rotational axis direction of the brake drum. Accordingly, it becomes possible to construct the driving unit that is excellent in the property of being mounted in the interior of the brake drum.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 4:
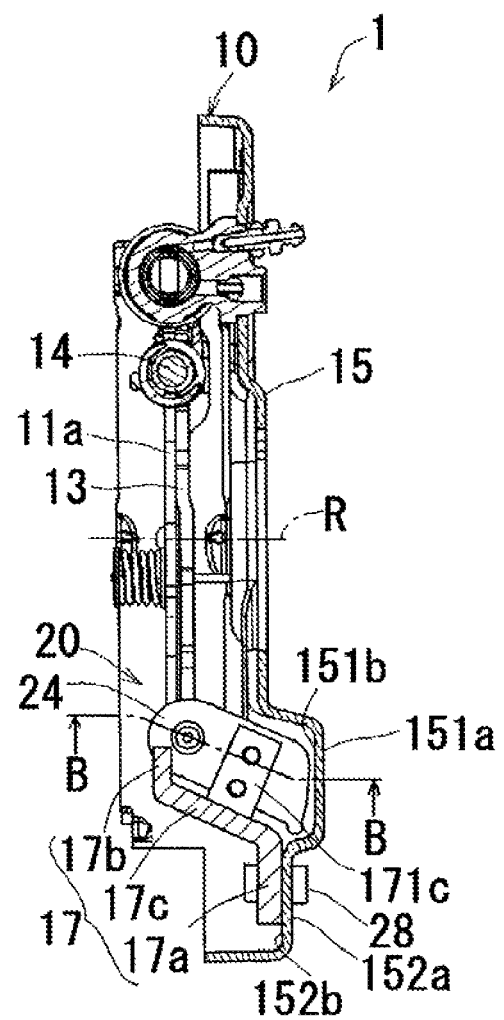
FIG. 4 is a sectional view taken along the line A-A of the electric parking brake device in FIG. 3 as viewed in a direction orthogonal to the rotational axis of the brake drum.
Figure 5:
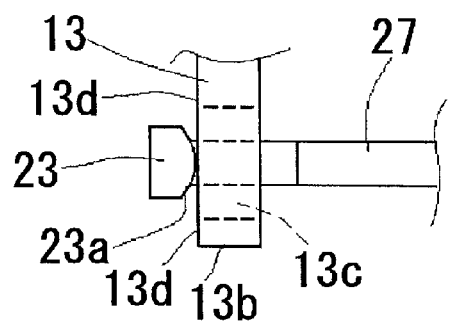
Figure 5:
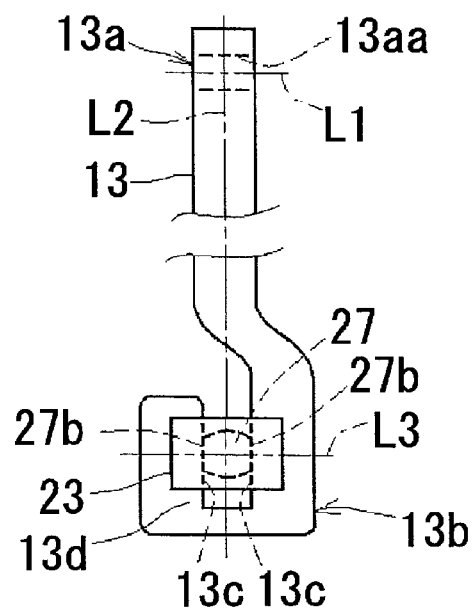
Figure 6:
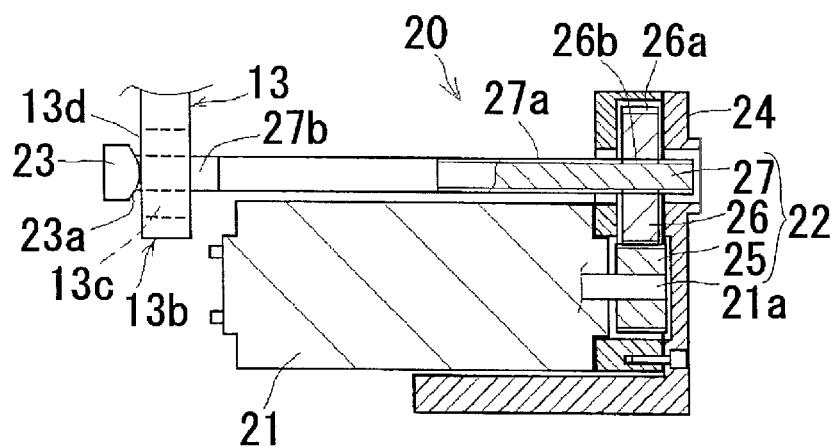
Figure 7:
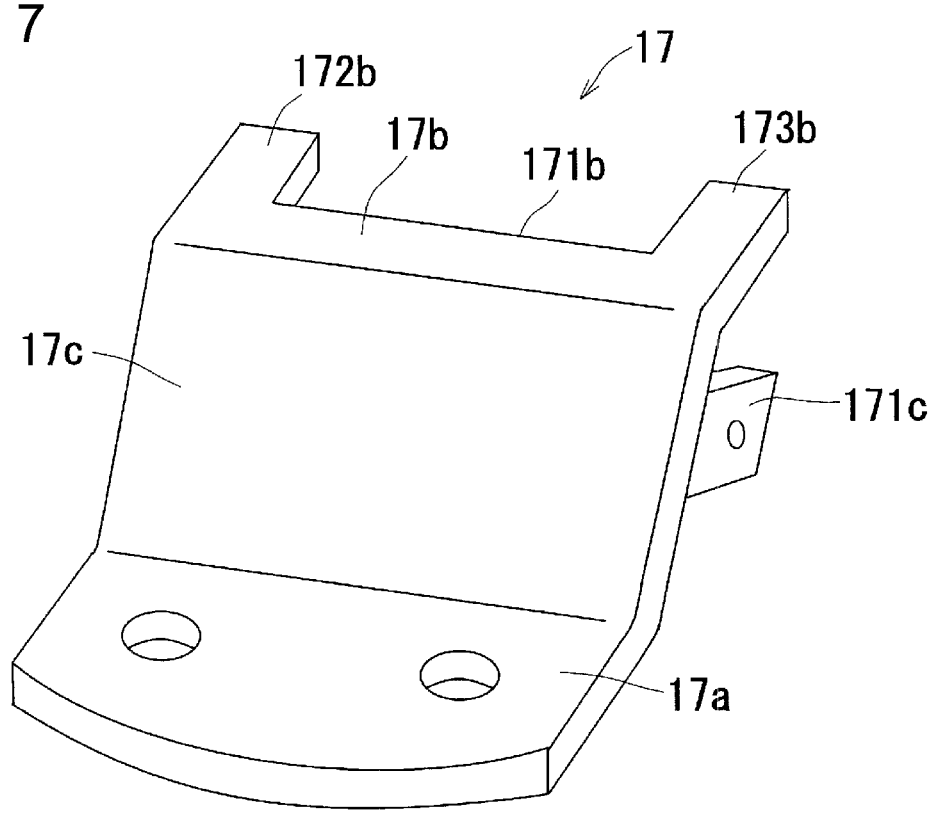
Figure 8:
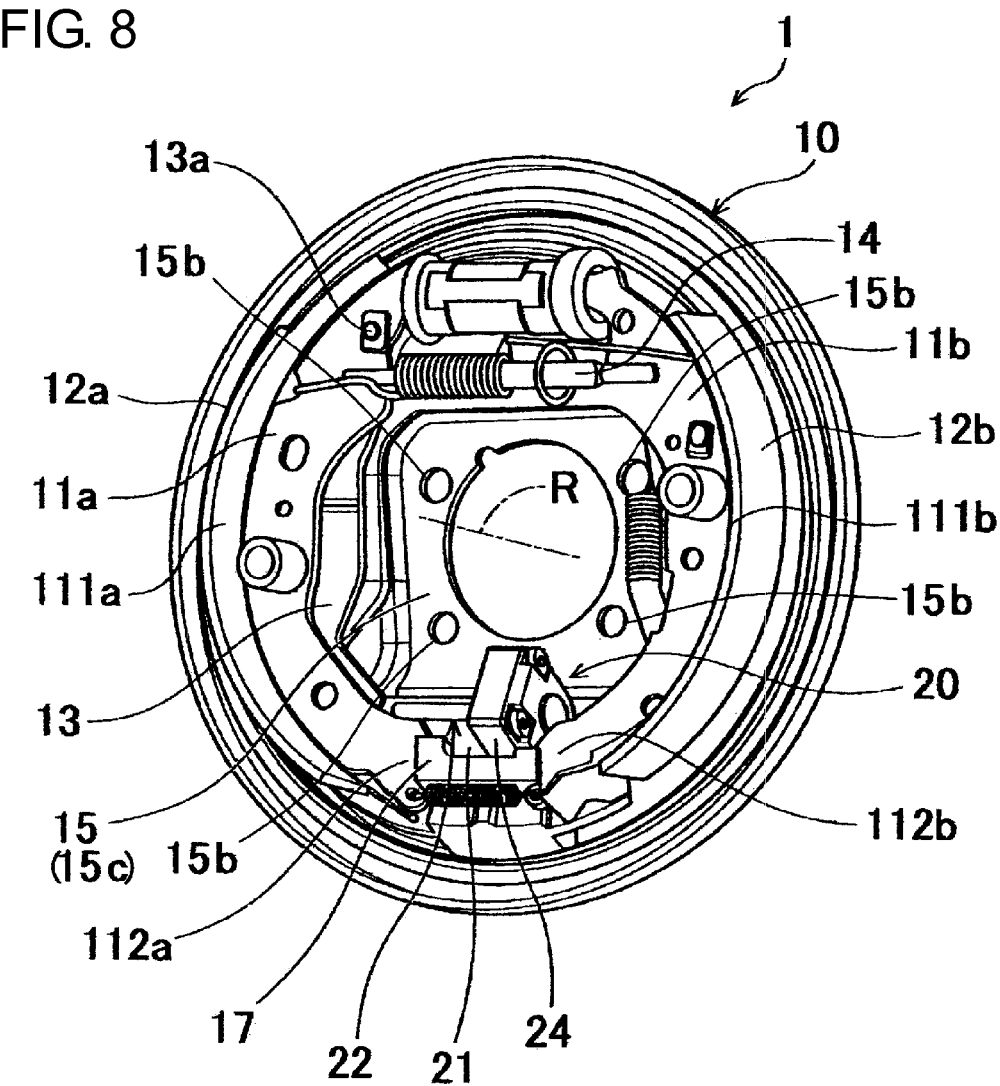
Figure 9:
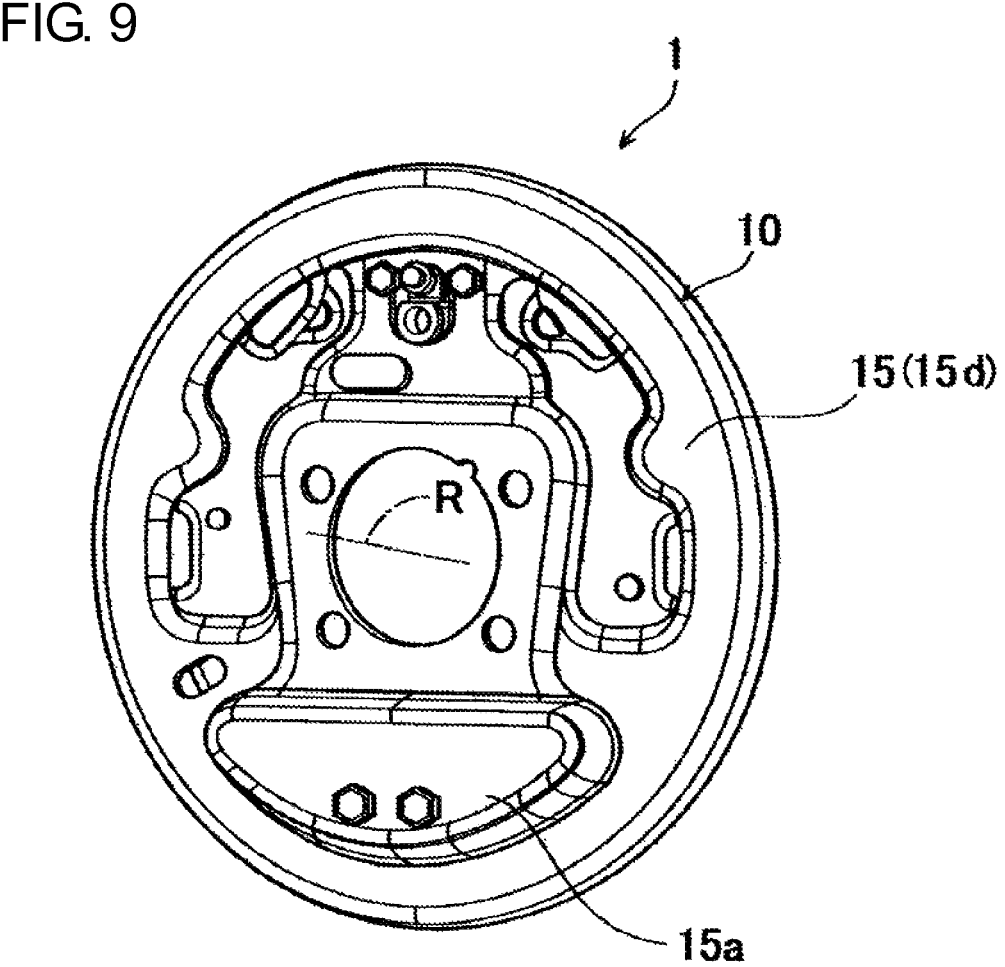
Figure 10:
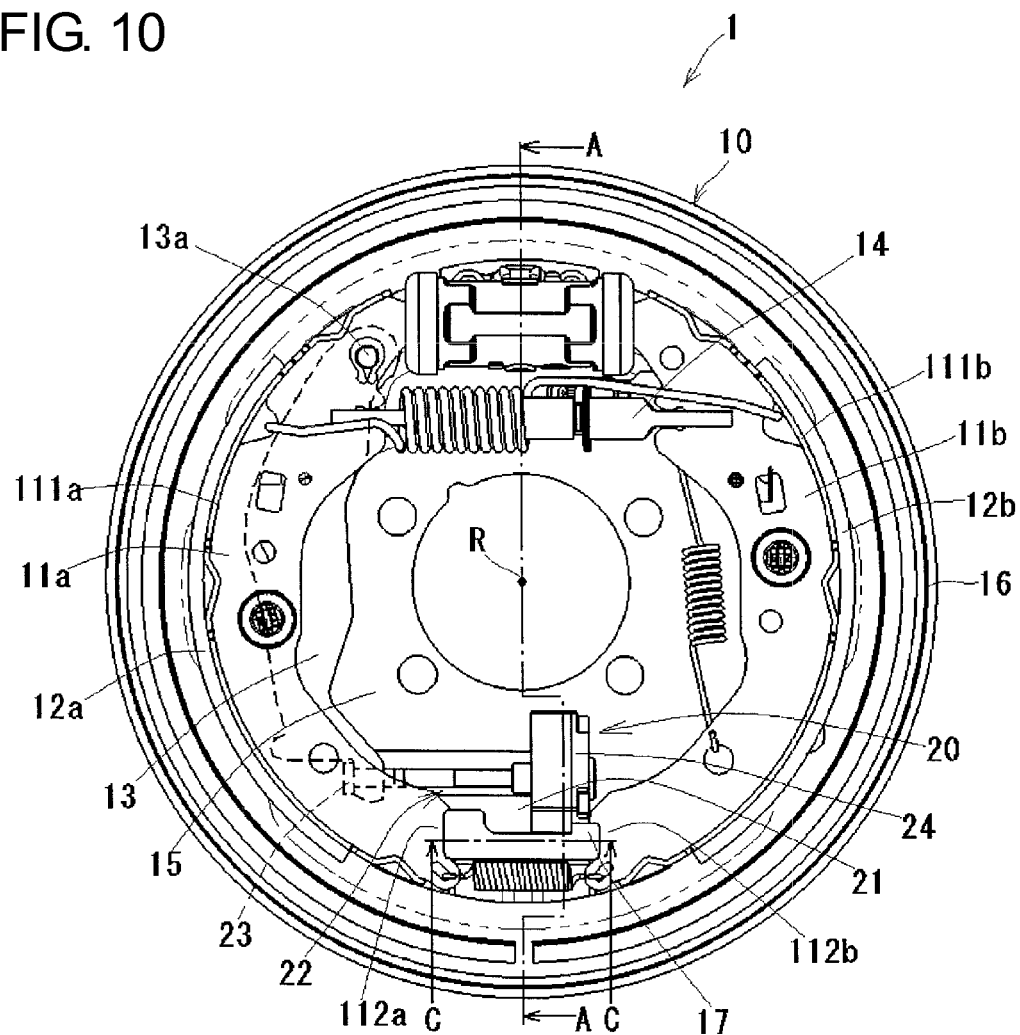
Figure 11:
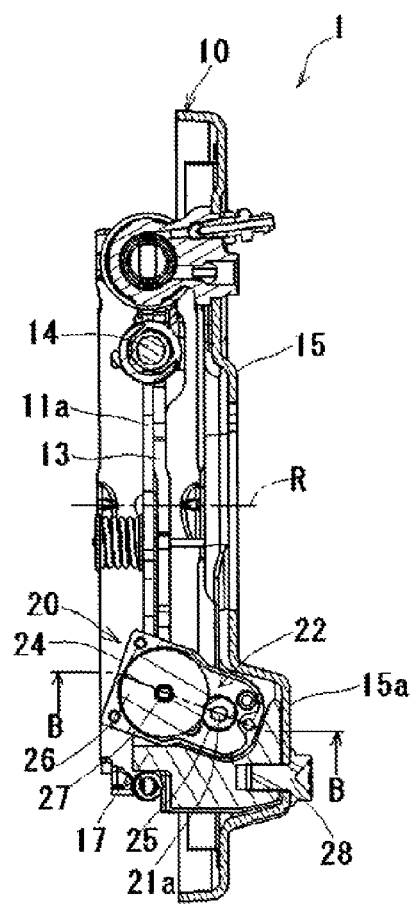
Figure 12:
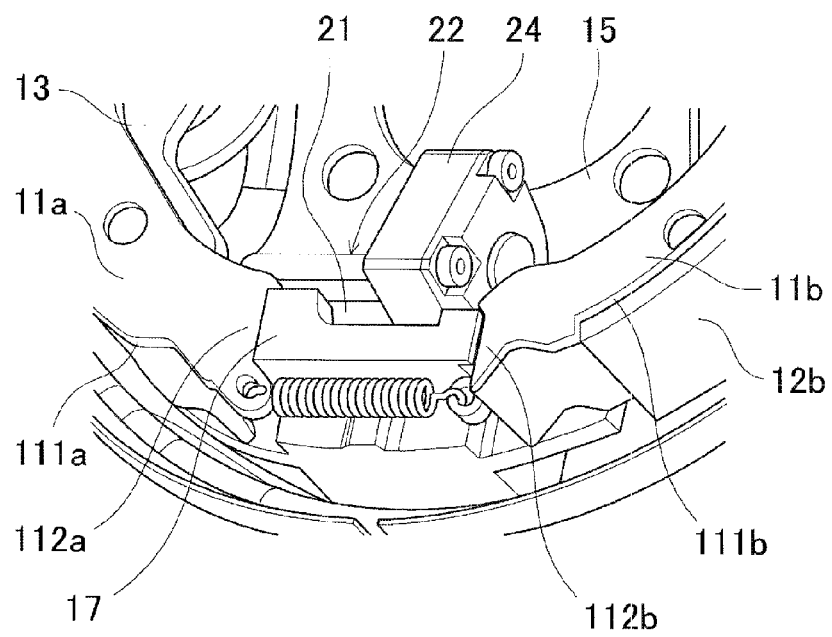
Figure 13:
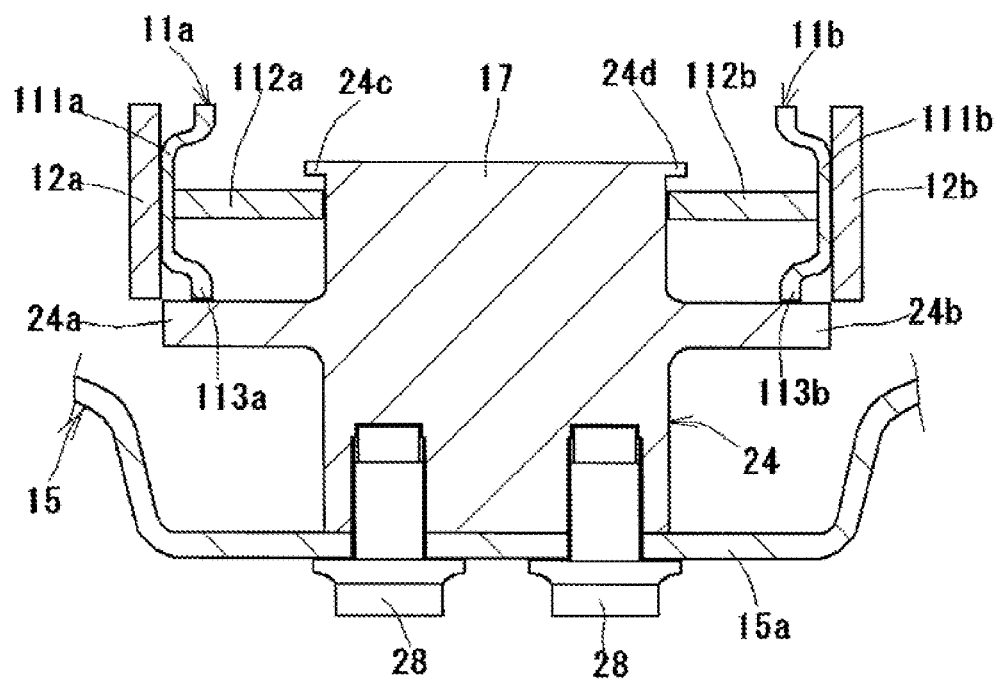
Figure 14:
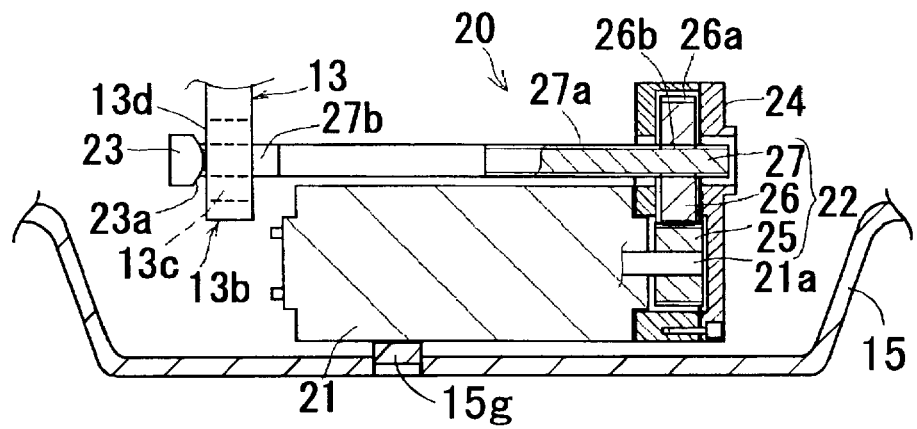

FIGS. 5(A) and 5(B) are fragmentary views showing the connection state between a drive unit of the electric parking brake device and a parking lever as viewed respectively in the rotational axis direction of the brake drum and in the direction orthogonal to the rotational axis;

FIG. 6 is an enlarged sectional view taken along the line B-B in FIG. 4, showing an electric motor, a rotational member and an axial motion member of the drive unit in the electric parking brake device;

FIG. 7 is an enlarged perspective view showing an anchor block of the electric parking brake device;

FIG. 8 is a perspective view showing an electric parking brake device in a second embodiment according to the present invention as viewed from a brake drum side;

FIG. 9 is a perspective view showing the electric parking brake device in FIG. 8 as viewed from an attaching portion side to a vehicle body;

FIG. 10 is a front view showing the electric parking brake device in FIG. 8 as viewed in the rotational axis direction of a brake drum;

FIG. 11 is a sectional view taken along the line A-A of the electric parking brake device in FIG. 10 as viewed in a direction orthogonal to the rotational axis line of the brake drum;

FIG. 12 is an enlarged perspective view showing an area of a drive unit in the electric parking brake device in FIG. 8;

FIG. 13 is an enlarged sectional view taken along the line C-C of the electric parking brake device in FIG. 10, showing a case of the drive unit; and FIG. 14 is a sectional view similar to that in FIG. 6, showing a modified form of the electric parking brake device.

DETAILED DESCRIPTION OF THE PREFERRED EMBODIMENTS

First Embodiment

Hereinafter, a first embodiment of the present invention will be described with reference to the drawings. As shown in FIGS. 1-4, an electric parking brake device 1 is composed of a drum brake 10 incorporating a parking brake mechanism and a drive unit 20 for driving the parking brake mechanism.

Figure 1:
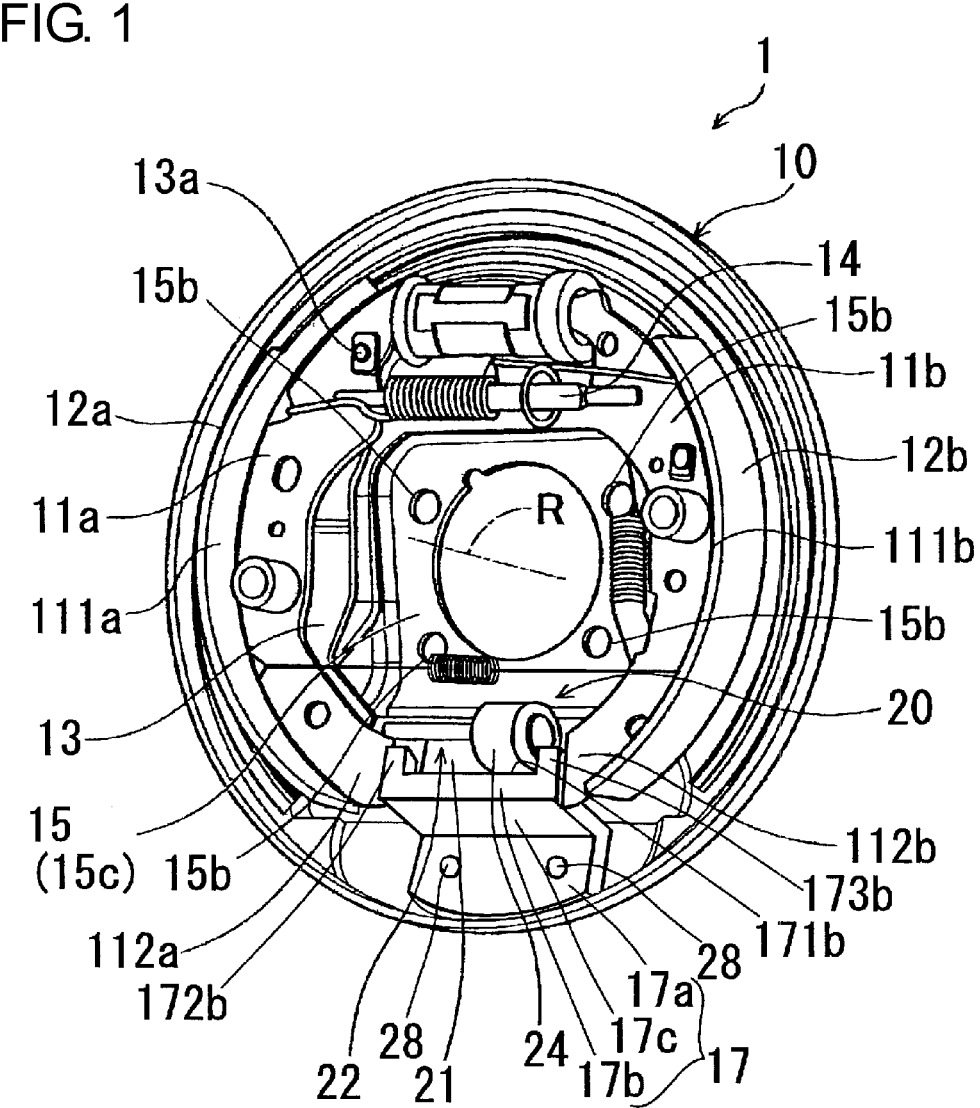
FIG. 1 is a perspective view showing an electric parking brake device in a first embodiment according to the present invention as viewed from a brake drum side.
Figure 3:
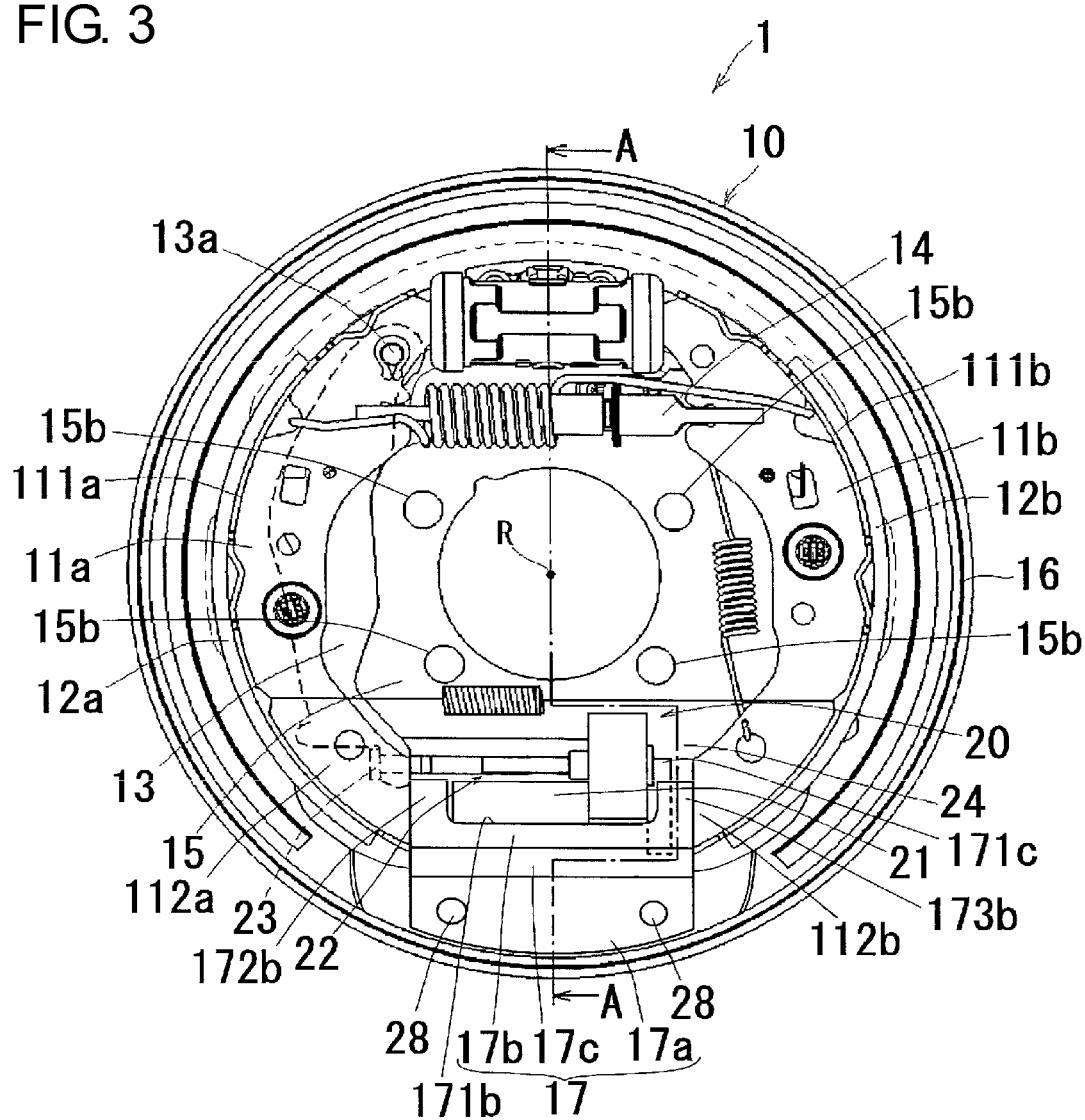
FIG. 3 is a front view showing the electric parking brake device in FIG. 1 as viewed in the rotational axis direction of a brake drum.

As shown in FIGS. 1 and 3, the drum brake 10 is composed of a pair of brake shoes 11a, 11b, a pair of brake linings 12a, 12b, a parking lever 13, a connection member 14, a back plate 15, a brake drum 16 (refer to FIG. 3), and an anchor block 17.

The pair of brake shoes 11a, 11b are each formed to an arc shape and are provided on the outer circumferential sides thereof with lining-adhesion portions 111a, 111b to which the pair of the brake linings 12a, 12b are respectively adhered. In order to be able to be widened toward opposite sides relative to the center of the brake drum 16 and in order to enable the pair of brake linings 12a, 12b to come contact with, and away from, the inner circumference of the brake drum 16, the pair of brake shoes 11a, 11b are pivotally supported on an inside surface 15c of the back plate 15 and are supported at respective one end portions 112a, 112b on the anchor block 17 fixed on the inside surface 15c of the back plate 15.

The parking lever 13 has a pivot support portion 13a on one end side which is pivotally movably supported on one (in this embodiment, on the left side in FIG. 1) of the brake shoes 11a, and is arranged along the brake shoe 11a. Then, the connection member 14 is interposed between the parking lever 13 and the the other brake shoe 11b.

As shown in FIGS. 5(A) and 5(B), a through hole 13a that permits the parking lever 13 to tilt is formed on the pivot support portion 13a of the parking lever 13. The parking lever 13 is bent on the other end side to almost an inverted J-letter shape that is almost symmetrical with respect to a lever axis L2 of the parking lever 13 extending perpendicularly of a rotational axis L1 of the pivot support portion 13a on the one end side. This bent portion 13b of the parking lever 13 is formed on inner sides thereof with facing surfaces 13c, 13c being parallel to the lever axis L2. One end portion (the left end portion in FIG. 3) of a screw shaft member 27 referred to later is pierced between the facing surface 13c, 13c of the bent portion 13b.

As shown in FIGS. 1 and 3, the back plate 15 takes a disc-like shape and is fixed to an attaching portion on the vehicle body side at an outside surface 15d thereof. That is, the back plate 15 is fixed to the attaching portion (irrotational body, not shown) on the vehicle body side which is on the deep side beyond the back plate 15 in the drawing sheets of FIGS. 1 and 3, by means of bolts (in the embodiment, four bolts, not shown) screwed into bolt holes 15b at the center part of the back plate 15. The brake drum 16 is on the inside surface 15c side of the back plate 15 and is arranged rotatably about a rotational axis R.

Figure 2:
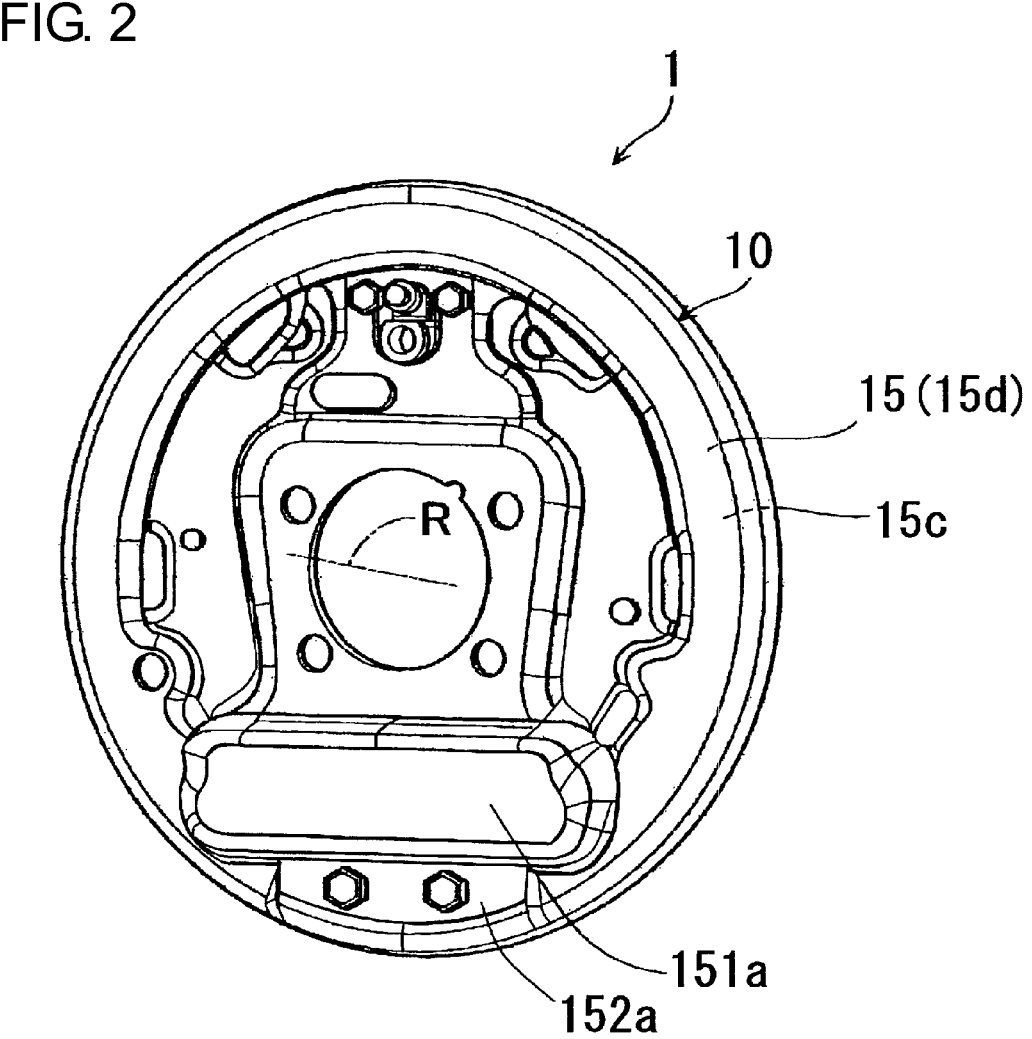
FIG. 2 is a perspective view showing the electric parking brake device in FIG. 1 as viewed from an attaching portion side to a vehicle body.

As best shown in FIG. 4, at a portion on the inside surface 15c of the back plate 15 where the drive unit 20 is arranged, a first concave portion 151a that is depressed toward the outside surface 15d side as shown in FIG. 2, is provided to be able to house at least a part of a case 24 of the drive unit 20 referred to later. Further, at a portion on the inside surface 15c of the back plate 15 where the anchor block 17 is fixed, a second concave portion 152a that is depressed toward the outside surface 15d side and that is shallower in depth than the first concave portion 151a is provided to be able to fix a fixed portion 17a of the anchor block 17 referred to later. The first concave portion 151a and the second concave portion 152a are provided continuously. For example, the first concave portion 151a and the second concave portion 152a may be formed by deep-drawing to become a convex shape on the outside surface 15d as viewed from the attaching portion side to the vehicle body. However, the first concave portion 151a and the second concave portion 152a are not limited to being formed by this way of forming. For example, as the first concave portion 151a and the second concave portion 152a, there may be included those which are depressed only on the inside surface 15c (but does not become convex on the outside surface 15d).

As shown in FIGS. 1 and 3, the drive unit 20 is mainly composed of the electric motor 21, a rotation-linear motion converting mechanism 22, a motion transmitting member 23 (refer to FIG. 3), and the case 24.

As shown in FIG. 6, the part on a rotational shaft 21a side of the motor 21 is housed in the case 24 and is fixed thereto. The rotation-linear motion converting mechanism 22 is composed of a pinion 25, a nut member 26 (corresponding to "rotational member" in the claimed invention), and a screw shaft member 27 (corresponding to "axial motion member" in the claimed invention). The rotation-linear motion converting mechanism 22 is a mechanism for converting the rotational motion of the nut member 26 about the axis into the linear motion of the screw shaft member 27 in the axial direction.

The pinion 25 is a spur gear or helical gear, is secured to the rotational shaft 21a of the motor 21 and is rotatably supported in the case 24. The nut member 26 is provided at its outer circumference with helical teeth 26a meshing with the pinion 25 and is provided at its inner circumference with a screw hole 26b screw-engaged with a threaded portion 27a of the screw shaft member 27. The screw shaft member 27 is provided at the outer outer circumference with the threaded portion 27a screw-engaged with the screw hole 26b of the nut member 26. The screw shaft member 27 is rotatably supported in the case 24 through bearings (not shown), and the nut member 26 is rotatably supported in the case 24 by being screw-engaged with the screw shaft member 27.

One end portion of the screw shaft member 27 (on the left end side in FIG. 6) is formed with two diametrically opposed flat surfaces 27b, 27b (refer to FIG. 5(B)) the distance between which is narrower than the distance between the facing surfaces 13c, 13c of the bent portion 13b of the parking lever 13. The two diametrically opposite flat surfaces 27b, 27b of the screw shaft member 27 are fitted between the facing surfaces 13c, 13c at the bent portion 13b of the parking lever 13 in order to restrain the screw shaft member 27 from rotating about the axis but to permit the same to move in the axis direction.

The motion transmitting member 23 is formed to the shape of an almost rectangular parallelepiped, so called semicylindrical shape, whose one surface takes a convex circular surface 23a. The motion transmitting member 23 is provided to be connected bodily with one end of the screw shaft member 27 on the circular surface 23a side so that a center axis L3 of the circular surface 23a becomes parallel to the pivot axis L1 of the pivot support portion 13a of the parking lever 13 (refer to FIG. 5B). The motion transmission member 23 is a member that transmits to the parking lever 13 the motion transmitting force exerted by the linear motion in the axial direction of the screw shaft member 27. The circular surface 23a of the motion transmitting member 23 is held in contact with a side surface 13d on the brake shoes 11a side of the bent portion 13b of the parking lever 13 (refer to FIG. 5A).

As shown in FIGS. 1, 3, 4 and 7, the anchor block 17 is bent by press-forming a rectangular plate-like member to a shape that opposite end portions of the plate-like member are protruded in opposite directions, that is, to an almost S-letter shape in the side view (refer to FIG. 4). One protruding end portion of the anchor block 17 is formed as a fixed portion 17a which is fixed to a bottom portion 152b of the second concave portion 152a on the back plate 15 by means of bolts 28. The other protruding end portion of the anchor block 17 is formed as an anchor portion 17b supporting the respective one end portions 112a, 112b of the pair of the brake shoes 11a, 11b. Further, a middle portion connecting to the opposite ends portions of the anchor block 17 is formed as a connection portion 17c on which the case 24 of the drive unit 20 is mounted.

The anchor portion 17b is provided with a cutout portion 171b that permits the case 24 of the drive unit 20 mounted on the connection portion 17c to pass therethrough so that the attaching and detaching of the case 24 of the drive unit 20 become possible. The cutout portion 171b is formed to cut out a rectangular portion between both side portions 172b and 173b of the rectangular anchor portion 17b with both end portions 172b and 173b left. The respective one end portions 112a, 112b of the pair of brake shoes 11a, 11b are supported on the both side portions 172b and 173b of the anchor portion 17b.

The connection portion 17c protrudes a mounting portion 171c on which the case 24 of the drive unit 20 is detachably mounted by means of bolts. The mounting portion 171c is bodily bent when the anchor block 17 is press-formed. The mounting portion 171c may be manufactured as a separate member and may be welded or bolt-fastened to the connection portion 17c.

Next, description will be made regarding the operation of the electric parking brake device 1 in the first embodiment as constructed above. Generally, the electric parking brake device 1 is mounted on each of rear wheels of a vehicle. Further, parking brake switches (not shown) for respectively manipulating both of the electric parking brakes 1, 1 are provided on a dashboard of the vehicle. When applying the parking brake, the driver turns each parking brake switch to ON. Then, the motor 21 rotates, and the rotational motion is transmitted to the nut member 26 through the pinion 25. Thus, the transmitted rotational motion is converted into the linear motion of the screw shaft member 27 toward the right in FIG. 1. Consequently, the parking lever 13 is rotated counterclockwise in FIG. 1.

The fixed portion 17a of the anchor block 17 is fixed by means of the bolts 28 on the bottom portion 152b of the second concave portion 152a that is shallower in depth than the first concave portion 151a. Thus, in comparison with the case where the fixed portion 17a of the anchor block 17 is fixed on the bottom portion 151b of the first concave portion 151a, the distance between the fixed portion 17a and the rotation-linear motion converting mechanism 22 of the drive unit 20 is shortened to diminish the moment of a force that acts on the fixed portion 17a at the time of the driving of the drive unit 20. Therefore, safety can be improved in the strength of the bottom portion 152b of the second concave portion 152a of the back plate 15 on which the fixed portion 17a of the anchor block 17 is fixed.

Then, the parking lever 13 pushes the brake shoe 11a on the brake drum 16 with a fulcrum set on the one end portion 112a of the brake shoe 11a supported on the side portion 172b of the anchor portion 17b of the anchor block 17. At the same time, through the connection member 14, the parking lever 13 pushes the brake shoe 11b on the brake drum 16 with a fulcrum set on the one end portion 112b of the brake shoe 11b supported on the side portion 173b of the anchor portion 17b of the anchor block 17.

Thus, the brake linings 12a, 12b are frictionally engaged with the inner circumference of the brake drum 16. In this manner, the parking brake is applied. At this time, the motor 21 is controlled to be stopped when electric current of a predetermined level or higher flows across the motor 21. Thus, it is possible to obtain a constant parking brake force at all times. On the other hand, when the parking brake is to be released, the passenger turns the parking brake switches to OFF. Thus, the motor 21 rotates in a direction opposite to the preceding rotation, and the parking brake is released. At this time, the power supply to the motor 21 is discontinued when the no-load current is reached. Therefore, it is possible to suppress useless energy consumption.

Second Embodiment

Next, a second embodiment of the present invention will be described with reference to the drawings. As shown in FIGS. 8-13, an electric parking brake device 1 is composed of a drum brake 10 incorporating a parking brake mechanism and a drive unit 20 for driving the parking brake mechanism.

As shown in FIG. 8, the drum brake 10 is mainly composed of a pair of brake shoes 11a, 11b, a pair of brake linings 12a, 12b, a parking lever 13, a connection member 14, a back plate 15, a brake drum 16 (refer to FIG. 10), and an anchor portion 17.

As best shown in FIG. 11, at a portion on an inside surface 15c of the back plate 15 where the drive unit 20 is arranged, a concave portion 15a depressed toward an outside surface 15d side is provided to be able to house at least a part of a case 24 of the drive unit 20 referred to later. As shown in FIG. 9, for example, the concave portion 15a may be formed by deep-drawing to become a convex shape conversely when the outside surface 15d is viewed on the attaching portion side to the vehicle body. However, the concave portion 15a is not limited to such a shape. For example, there is included another shape that has a concave only on the inside surface 15c (but does not have any convex on the outside surface 15d).

The case 24 and the anchor portion 17 are bodily formed to be piled up in the rotational axis R direction of the brake drum 16. That is, as shown in FIG. 13, the case 24 is fixed on a bottom surface of the concave portion 15a of the back plate 15 by means of rivets 28 at an end portion on the back plate 15 side in the rotational axis R direction. Then, the anchor portion 17 is bodily formed at an end portion opposite to the back plate side in the rotational axis R direction, that is, at the end portion on the opposite side to the back plate 15 side.

The case 24 is provided with bearing portions 24a, 24b that bear parts 113a, 113b of lining-adhesion portions 111a, 111b of the pair of the brake shoes 11a, 11b in the rotational axis R direction of the brake drum 16 to support the pair of the brake shoes 11a, 11b, and the bearing portions 24a, 24b are protruded from sides of the center of the case 24 in a direction orthogonal to the rotational axis R of the brake drum 16.

Further, the case 24 is provided with disengagement preventing portions 24c, 24d that prevent the pair of brake shoes 11a, 11b from moving in a direction to separate from the back plate 15 and from separating from the end portion of the case 24 which end is on the opposite side to the back plate side in the rotational axis R direction. The disengagement preventing portions 24c, 24d are protruded from sides of the end portion of the case 24 which end portion is opposite to the back plate side in the rotational axis R, in a direction orthogonal to the rotational axis R of the brake drum 16. Other constructions are the same as those in the foregoing first embodiment, and therefore, description therefor will be omitted for the sake of brevity.

Next, description will be made regarding the operation of the electric parking brake device 1 in the second embodiment as constructed above. Generally, the electric parking brake device 1 is mounted on each of rear wheels of a vehicle. Further, parking brake switches (not shown) for respectively manipulating both of the electric parking brake devices 1, 1 are provided on a dashboard of the vehicle. When applying the parking brake, the driver turns each parking brake switch to ON. Then, the motor 21 rotates, and the rotational motion is transmitted to the nut member 26 through the pinion 25. Thus, the transmitted rotational motion is converted into the linear motion of the screw shaft member 27 toward the right in FIG. 8. Consequently, the parking lever 13 is rotated counterclockwise in FIG. 8.

Thus, the parking lever 13 pushes the brake shoe 11a on the brake drum 16 with a fulcrum set on one end portion 112a of the brake shoe 11a supported on the anchor portion 17 of the case 24. At the same time, through the connection member 14, the parking lever 13 pushes the brake shoe 11b on the drum 16 with a fulcrum set on one end portion 112b of the brake shoe 11b supported on the anchor portion 17 of the case 24. At this time, since the parts 113a, 113b of the pair of the brake shoes 11a, 11b are supported on the bearing portions 24a, 24b in the rotational axis R direction of the brake drum 16, the pair of brake shoes 11a, 11b are smoothly widened in the direction orthogonal to the rotational axis R of the brake drum 16. The respective one end portions 112a, 112b of the pair of the brake shoes 11a, 11b are engaged with the disengagement preventing portions 24c, 24d and thus, do not come off from the opposite end portion to the back plate side end of the case 24 in the rotation axis R direction. As a result, the pair of the brake shoes 11a, 11b are reliably widened in the direction orthogonal to the rotation axis R of the brake drum 16.

Then, the brake linings 12a, 12b are frictionally engaged with the inner circumference of the brake drum 16. In this manner, the parking brake is applied. At this time, the motor 21 is controlled to be stopped when electric current of a predetermined level or higher is flown across the motor 21. Thus, a predetermined parking brake force can be obtained at all times. On the other hand, when the parking brake is to be released, the passenger turns the parking brake swithches to OFF. Then, the motor 21 rotates in a direction opposite to the preceeding rotational direction, whereby the parking brake is released. At this time, the power supply to the motor 21 is controlled to be cut off when the no-load current is reached. Therefore, it is possible to suppress useless energy consumption.

Effects of the Embodiments

According to each of the forgoing first and second embodiments typically shown in FIGS. 1, 4, 10, 12 and 13, the anchor portion 17b, 17 and the drive unit 20 are arranged to be piled up in the rotational axis R direction of the brake drum 16 the space in which is roomy or spacious in comparison with the arrangement space in the direction orthogonal to the rotational axis R direction of the brake drum 16. Consequently, it is realized to construct the drive unit 20 that is excellent in the property of being mounted in the interior of the brake drum 16.

According to the forgoing first embodiment typically shown in FIGS. 1 and 4, the anchor block 17 is constituted by the plate-like member which protrudes the opposite end portions in the opposite directions, that is, by the plate-like member which takes the almost S-letter shape in the side view. Therefore, a space can be secured between the opposite end portions in the rotational axis R direction of the brake drum 16. Thus, the space can be utilized as a mounting space for the drive unit 20. The anchor block 17 can be used at the one end portion thereof as the fixed portion 17a that is fixed to the back plate 15, at the other end portion thereof as the anchor portion 17b that supportes the brake shoes 11a, 11b, and at the middle portion connecting the opposite end portions as the connection portion 17c that mounts the drive unit 20 thereon. That is, since the anchor block 17 takes the almost S-letter shape in the side view, the space can be secured between the fixed portion 17a and the anchor portion 17b and can be utilized as the mounting space for the drive unit 20. Therefore, the anchor block 17 and the drive unit 20 are arranged to be piled up in the rotational axis R direction of the brake drum 16 the space in which is roomy or spacious in comparison with the arrangement space in the direction orthogonal to the rotational axis R direction of the brake drum 16. Consequently, it is realized to construct the drive unit 20 that is excellent in the property of being mounted in the interior of the brake drum 16.

More specifically, in the interior of the brake drum 16, since the anchor block 17 and the hub components or the like on the vehicle body side are arranged in the direction orthogonal to the rotational axis R direction, the arrangement space in the rotational axis R direction of the brake drum 16 is spacious in comparison with the arrangement space in the direction orthogonal to the rotational axis R direction of the brake drum 16. Thus, by arranging the anchor block 17 and the drive unit 20 to be piled up in the rotational axis R direction of the brake drum 16, it becomes possible to arrange the anchor block 17 and the drive unit 20 in the interior of the brake drum 16. Consequently, it is realized to construct the drive unit 20 that is excellent in the property of being mounted in the interior of the brake drum 16.

Since the drive unit 20 is fixed on the back plate 15 through the anchor block 17, the drive unit 20 is protected by the back plate 15, so that the drive unit 20 can be enhanced in waterproof and dustproof. Further, since the anchor block 17 and the case 24 of the drive unit 20 can be constituted as different members, materials necessary for respective functions of the anchor block 17 and the case 24 of the drive unit 20 can be selected, so that the anchor block 17 and the case 24 can be reduced in weight and cost.

Further, according to the foregoing first embodiment typically shown in FIGS. 1 and 7, the anchor portion 17b is provided with the cutout portion 171b that permits at least a part of the drive unit 20 or the case 24 of the drive unit 20 supported on the connection portion 17c to pass therethrough. Thus, the worker can perform the work to attach and detach the drive unit 20 to and from the connection portion 17c through the cutout portion 171b. Consequently, it is realized to construct the drive unit 20 that is excellent in the property of being assembled in the interior of the brake drum 16.

Further, according to the foregoing first embodiment typically shown in FIG. 4, the first concave portion 151a housing at least a part of the drive unit or the case 24 of the drive unit 20 and the like is formed by depressing the back plate 15 toward the vehicle body side. Thus, the arrangement space for the drive unit 20 can be enlarged, so that it is possible to mount the drive units 20 of various dimensions each producing an output power depending on the vehicle weight, in the interior of the brake drum 16. Further, the second concave portion 152a to which the fixed portion 17a of the anchor block 17 is fixed is formed by depressing the back plate 15 toward the vehicle body side in the depth that is shallower than that of the first concave portion 151a. Thus, in comparison with the case where the fixed portion 17a is fixed on the first concave portion 151a, the distance between the fixed portion 17a and the drive unit 20 is shortened, and hence, to diminish the moment in force that is exerted on the fixed portion 17a when the drive unit 20 is driven. Therefore, the back plate 15 can be improved in safety of strength as a result of fixing the fixed portion 17a of the anchor block 17 thereon.

Further, according to the foregoing first embodiment typically shown in FIGS. 4 and 7, since the connection portion 17c protrudes the mounting portion 171c which detachably mounts the case 24 of the drive unit 20, the drive unit 20 can easily be fixed on the mounting portion 171c.

Further, according to the foregoing first embodiment typically shown in FIGS. 4 and 7, since the anchor block 17 is formed by press-forming a plate-like member, the anchor block 17 can be reduced in manufacturing cost. Preferably, the anchor block 17 is bodily provided with the mounting portion 171c.

Further, according to the foregoing first embodiment typically shown in FIGS. 4 and 7, the mounting portion 171c that detachably mounts the case 24 of the drive unit 20 is protruded bodily from the connection portion 17c by press-forming. Therefore, the anchor block 17 provided with the mounting portion 171c can be reduced in manufacturing cost.

According to the forgoing second embodiment typically shown in FIGS. 10, 12 and 13, the anchor portion 17 and the case 24 are bodily formed to be piled up in the rotational axis R direction of the brake drum 16, and the case 24 is fixed on the back plate 15. In the interior of the brake drum 16, since the anchor portion and the hub components and the like on the vehicle body side are arranged in the direction orthogonal to the rotational axis R direction of the brake drum 16, the arrangement space in the brake drum 16 in the rotational axis R direction is roomy or spacious in comparison with the arrangement space for the brake drum 16 in the direction orthogonal to the rotational axis R direction. Thus, the anchor portion 17 and the case 24 can be bodily arranged to be piled up in the rotational axis R direction of the brake drum 16, and hence, it becomes possible to arrange the anchor portion 17 and the case 24 in the interior of the brake drum 16. Therefore, it is realized to construct the drive unit 20 that is excellent in the property of being mounted in the interior of the brake drum 16. Further, by fixing the case 24 on the back plate 15, the drive unit 20 is protected by the back plate 15. Consequently, the drive unit 20 can be enhanced in waterproof and dustproof.

Further, according to the forgoing second embodiment typically shown in FIGS. 9 and 11, the concave portion 15a housing and fixing at least a part of the case 24 is formed by depressing the back plate 15 toward the vehicle body side. Thus, the arrangement space for the case 24 can be enlarged. Consequently, it is possible to mount the drive units 20 of various dimensions each producing an output power depending on the vehicle weight, in the interior of the brake drum 16.

Further, according to the forgoing second embodiment typically shown in FIG. 13, the case 24 is provided with the bearing portions 24a, 24b which support the pair of the brake shoes 11a, 11b by bearing the parts 113a, 113b of the pair of the brake shoes 11a, 11b in the rotational axis R direction of the brake drum 16. In the prior art, the bearing portions are provided on the back plate in the vicinity of the anchor portion. However, in the second embodiment, because the anchor portion 17 and the case 24 are bodily formed to be piled up in the rotational axis R direction of the brake drum 16 and because the case 24 is fixed on the back plate 15, the bearing portions 24a, 24b cannot be provided on the back plate 15. Therefore, by providing the bearing portions 24a, 24b on the case 24, it is possible to provide the bearing portions 24a, 24b in the vicinity of the anchor portion 17 and hence, to support the pair of the brake shoes 11a, 11b rigidly. Consequently, the pair of the brake shoes 11a, 11b can be smoothly widened in the direction orthogonal to the rotational axis R of the brake drum 16.

Further, according to the forgoing second embodiment typically shown in FIG. 13, the case 24 is fixed on the back plate 15 at the end portion on the back plate 15 side in the rotational axis R direction and is bodily formed with the anchor portion 17 at the end portion opposite to the back plate side in the rotational axis R direction. Thus, the anchor portion 17 and the case 24 can easily be bodily formed to be piled up in the rotational axis R direction of the brake drum 16. Consequently, the electric parking brake device 1 can be enhanced in the property of being assembled.

Further, according to the forgoing second embodiment typically shown in FIG. 13, the disengagement preventing portions 24c, 24d that prevent the pair of brake shoes 11a, 11b from moving in the direction to separate from the back plate 15 and from separating from the case 24 are protruded in the direction orthogonal to the rotational axis R direction of the brake drum 16 from the side portions of the end portion of the case 24 that is opposite to the back plate 15 side in the rotational axis R direction. When the pair of the brake shoes 11a, 11b are widened, the pair of the brake shoes 11a, 11b are liable to move in the direction to separate from the back plate 15, and the respective one end portions 112a, 112b of the brake shoes 11a, 11b are liable to separate from the end portion opposite to back plate 15 side in the rotational axis R direction of the case 24. However, at this time, the respective one end portions 112a, 112b of the pair of the brake shoes 11a, 11b are engaged with the disengagement preventing portions 24c, 24d that are protruded in the direction orthogonal to the rotational axis R direction of the brake drum 16 from the side portions of the end portion of the case 24 that is opposite to the back plate 15 side in the rotational axis R direction, it does not occur that the respective one end portions 112a, 112b come off from the end portion of the case 24 opposite to the back plate 15 side in the rotational axis R direction. Therefore, it is possible to reliably widen the pair of the brake shoes 11a, 11b.

In addition, in the foregoing first and second embodiments typically shown in FIGS. 5(A) and 6, the circular surface 23a is formed on one surface of the motion transmitting member 23 that contacts the side surface 13d of the parking lever 13 on the brake shoe 11a side. Thus, it is possible to suppress the slip of the parking lever 13 when the same pivotally moved about the pivot support portion 13a by the linear motion of the screw shaft member 27. Consequently, the motion transmission force by the motion transmitting member 23 can be prevented from becoming an offset load, so that the parking lever 13 can be pivotally moved smoothly.

Further, in the foregoing first and second embodiments typically shown in FIGS. 5(A) and 5(B), the screw shaft member 27 pierces through the other end of the parking lever 13 to be restrained from relative rotation but to be relatively movable in the axis direction, and the motion transmitting member 23 is bodily provided on the extreme end portion of the screw shaft member 27. That is, at the two diametrically-opposite flat portions 27b, 27b, the screw shaft member 27 is fitted between the facing surfaces 13c and 13c formed at the bent portion 13b of the parking lever 13, and thus, is restrained from rotating about the axis of the screw shaft member 27 but is permitted to move in the axial direction. Then, the motion transmitting member 23 is bodily provided on the extreme end of the screw shaft member 27. Therefore, the rotational motion of the nut member 26 can reliably be converted into the linear motion of the screw shaft member 27.

Modifications of the Embodiments

In the foregoing first embodiment, the anchor block 17 is constructed to be provided with the mounting portion 171c on which the case 24 of the drive unit 20 is detachably mounted by means of the bolts. However, there may be taken a construction that detachably mounts the case 24 of the drive unit 20 on the connection portion 17c by means of the bolts without providing the mounting portion 171c.

Furthermore, in the foregoing first and second embodiments, the convex circular surface 23a is formed on the contact surface of the motion transmitting member 23 with the side surface 13d of the parking lever 13. However, the same effect can be achieved even where a convex circular surface is formed at a contact surface on the side surface 13d of the parking lever 13 with the motion transmitting member 23. Further, the same effect can be achieved even where a convex circular surface is formed on one of contact surfaces on the motion transmitting member 23 and the side surface 13d of the parking lever 13 and where a concave circular surface having the same diameter as the convex circular surface or having a larger diameter than the convex circular surface is formed on the other of the contact surfaces. Moreover, the shape of the contact surface is not limited to the circular surface, and the same effect can be achieved by forming a curved surface such as, for example, spherical surface or the like instead of the circular surface.

Further, although being constructed as the mechanism that converts the rotational motion of the nut member 26 about the axis into the linear motion of the screw shaft member 27 in the axial direction, the rotation-linear motion converting mechanism 22 may be constructed as a mechanism that converts the rotational motion of the screw shaft member 27 about the axis into the linear motion of the nut member 26 in the axial direction. Where this modified mechanism is taken, the motion transmitting member 23 may, for example, be provided bodily on an extreme end of a member that extends from the nut member 26 in the axial direction. Further, a rack-and-pinion mechanism may be employed as the rotation-linear motion converting mechanism 22.

Further, as shown in FIG. 14, a protrusion 15g that supports the motor 21 may be formed by cutting and bending the back plate 15. Thus, the components do not increase in number, and the motor 21 can be restrained from being moved due to the vibrations during the vehicle travelling. In this modification, the height of the projection 15g is set to be the same as or smaller than the thickness of the back plate 15, so that water or the like can be prevented from entering the interior of the back plate 15 form the exterior through the cut and bent portion.

Obviously, numerous further modifications and variations of the present invention are possible in light of the above teachings. It is therefore to be understood that within the scope of the appended claims, the present invention may be practiced otherwise than as specifically described herein.

What is claimed is:
1. An electric parking brake device comprising:
a back plate having an outside surface secured to an attaching portion on a vehicle body side;
a pair of brake shoes provided on an inside surface side of the back plate, respectively having brake linings frictionally engageable with a brake drum arranged rotatably about a rotational axis, and pivotally supported on the back plate;
an anchor block comprising 1) an anchor portion supporting respective one end portions of the pair of brake shoes and 2) a fixed portion;
a parking lever pivotally supported by one of the brake shoes at one end of the parking lever;
a connection member interposed between the parking lever and the other of the brake shoes for widening the pair of brake shoes toward the brake drum side with fulcrums set on the respective one end portions supported on the anchor portion to bring the pair of brake linings into friction engagements with the brake drum when pivotally moved; and
a drive unit in which a rotational member and an axial motion member mutually fitted through a converting mechanism for converting a rotational motion into a linear motion are supported by a case, in which the axial motion member is connected to the other end of the parking lever to be restrained from rotation, and in which when the rotational member is rotationally driven by an electric motor, the axial motion member is axially moved to pivotally move the parking lever; wherein
the axial motion member comprises an inflexible member;

the anchor portion and the drive unit are piled up along an axis having a direction extending parallel to the rotational axis;

the fixed portion is fixed on the back plate;

the anchor block is formed by a plate member comprising opposite end portions that protrude in opposite directions;

one end portion of the opposite end portions extends in a direction orthogonal to the rotational axis and constitutes the fixed portion;

the other end portion of the opposite end portions constitutes the anchor portion; and a middle portion of the anchor block connecting the opposite end portions is formed as a connection portion, wherein the drive unit is mounted to the back plate via the middle portion.

2. The electric parking brake device in claim 1, wherein the anchor portion is provided with a cutout portion that permits at least a part of the drive unit to pass through for attaching and detaching the drive unit to and from the connection portion.

3. The electric parking brake device in claim 1, wherein:

the back plate is provided with a first concave portion depressed toward the outside surface side and a second concave portion depressed toward the outside surface side to be shallower in depth than the first concave portion;

at least a part of the drive unit mounted on the connection portion is housed in the first concave portion; and the fixed portion is fixed to a bottom portion of the second concave portion.

4. The electric parking brake device in claim 1, wherein a mounting portion that detachably mounts the case of the drive unit is protruded from the connection portion.

5. The electric parking brake device in claim 1, wherein the anchor block is formed by press-forming the plate member.

6. The electric parking brake device in claim 5, wherein a mounting portion that detachably mounts the case of the drive unit is protruded bodily from the connection portion by press-forming.

7. An electric parking brake device comprising:

a back plate having an outside surface secured to an attaching portion on a vehicle body side;

a pair of brake shoes provided on an inside surface side of the back plate, respectively having brake linings frictionally engageable with a brake drum arranged rotatably about a rotational axis, and pivotally supported on the back plate;

an anchor block comprising 1) an anchor portion supporting respective one end portions of the pair of brake shoes and 2) a fixed portion;

a parking lever pivotally supported by one of the brake shoes at one end of the parking lever;

a connection member interposed between the parking lever and the other of the brake shoes for widening the pair of brake shoes toward the brake drum side with fulcrums set on the respective one end portions supported on the anchor portion to bring the pair of brake linings into friction engagements with the brake drum when pivotally moved; and a drive unit in which a rotational member and an axial motion member mutually fitted through a converting mechanism for converting a rotational motion into a linear motion are supported by a case, in which the axial motion member is connected to the other end of the parking lever to be restrained from rotation, and in which when the rotational member is rotationally driven by an electric motor, the axial motion member is axially moved to pivotally move the parking lever; wherein the anchor portion and the drive unit are piled up along an axis having a direction extending parallel to the rotational axis;

the drive unit is connected to the back plate via the anchor portion;

the fixed portion is fixed on the back plate;

the anchor block is formed by a plate member comprising opposite end portions that protrude in opposite directions;

one end portion of the opposite end portions extends in a direction orthogonal to the rotational axis and constitutes the fixed portion;

the other end portion of the opposite end portions constitutes the anchor portion; and a middle portion of the anchor block connecting the opposite end portions is formed as a connection portion, wherein the drive unit is mounted to the back plate via the middle portion.

8. The electric parking brake device in claim 1, wherein a mounting portion that detachably mounts the case of the drive unit is protruded bodily from the connection portion by press-forming.

* * * * *